No. 771,311. PATENTED OCT. 4, 1904.
C. J. KILLE.
VETERINARY TOOTH FILE.
APPLICATION FILED JULY 11, 1903.
NO MODEL.
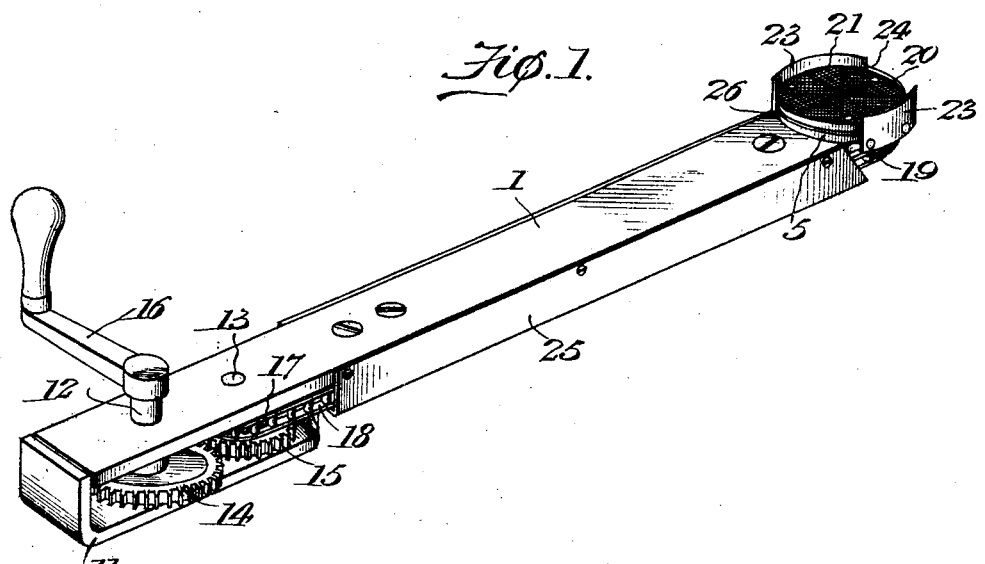
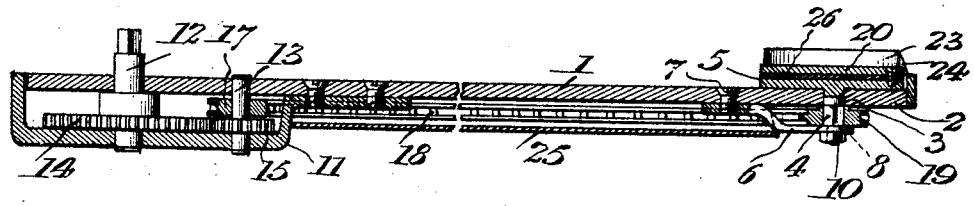
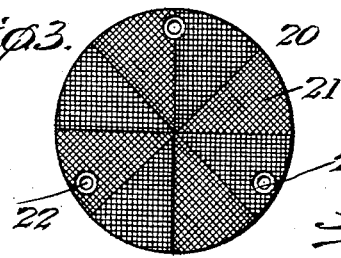
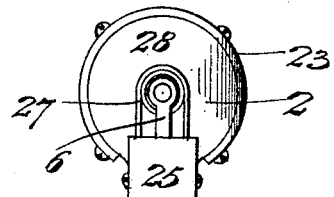

No. 771,311. Patented October 4, 1904.

UNITED STATES PATENT OFFICE.

CHALKLEY JUSTICE KILLE, OF EAST MOORESTOWN, NEW JERSEY.

VETERINARY TOOTH-FILE.

SPECIFICATION forming part of Letters Patent No. 771,311, dated October 4, 1904.

Application filed July 11, 1903. Serial No. 165,187. (No model.)

*To all whom it may concern:*

Be it known that I, CHALKLEY JUSTICE KILLE, a citizen of the United States, residing at East Moorestown, in the county of Burlington and State of New Jersey, have invented a new and useful Veterinary Tooth-File, of which the following is a specification.

This invention relates to veterinary dental apparatus, and it has particular reference to a file for filing, smoothing, leveling, and reducing the molars of horses, when necessary to do so, in a simple, painless, and non-irritating manner.

As is well known, when horses and kindred animals are fed largely on what is known as "soft feed" the molars from disuse will grow out rapidly and to an abnormal length, which eventually will interfere with the proper mastication and digestion of the food. When such has been the case, it has been customary sometimes to remove the molars entirely and at other times to chip or to file them off in such a manner as to permit a portion of the tooth to remain; but in every instance such procedure has been attended with more or less pain to the animal, while the value of the animal has been greatly reduced. A further objection to the ordinary procedure has been the difficulty or practical impossibility of properly smoothing and leveling the stump, if left in the mouth of the horse, causing ragged points to remain, which by contact with the tongue and cheeks would be apt to cut and injure the same, leaving the animal in a perpetual restless and nervous condition. Again, the process of breaking out the teeth or of removing portions thereof has been attended with more or less difficulty when means hitherto known and generally employed have been used.

By my present invention I produce a rotary flat-faced file and operating mechanism for the same by means of which the molars of a horse may be operated upon easily and painlessly and without the slightest danger of injuring the tongue, cheeks, or other parts of the mouth of the horse. The molars may thus be reduced in a simple and convenient manner to the proper length, which will enable the animal to properly masticate its food.

In the accompanying drawings I have shown a simple and preferred form of my invention; but I desire it to be understood that I do not thereby limit myself to the precise structural details herein set forth; but reserve to myself the right to any changes, alterations, and modifications which may be resorted to within the scope of my invention and without departing from the spirit or sacrificing the efficiency of the device.

In said drawings, Figure 1 is a perspective view of a device constructed in accordance with the principles of my invention. Fig. 2 is a longitudinal sectional view of the same. Fig. 3 is a plan view of one of the circular disk files. Fig. 4 is a plan view showing the opposite side of the same. Fig. 5 is a detail view of one end of the device, illustrating a modification.

Corresponding parts in the several figures are indicated by similar numerals of reference.

In the form of embodiment of my invention shown in the accompanying drawings, 1 designates a handle-bar, which terminates at one end in a circular head 2. The latter is provided with a central perforation 3, forming a bearing for a spindle 4, carrying at its upper end a circular disk 5, which constitutes the base for the attachment of my rotary file.

6 designates a bracket, which is secured in any suitable manner, such as by means of screws 7, to the under side of the handle-bar 1 adjacent to the head 2, under which the said bracket projects, it being provided with a perforation 8, forming a bearing for the lower end of the shank 4. The portion of the latter which extends below the bracket 6 is reduced and screw-threaded, as shown at 9, to receive a nut 10, whereby it is retained in position. Any other suitable and well-known means for retaining in position the shank 4, carrying the disk 5, are within the scope of my invention. To the opposite end of the handle-bar, which latter may be of any desired length, I secure a bracket 11, said bracket and handle-bar being provided with bearings for an operating-shaft 12 and for a countershaft 13, the former of which, in the form herein illustrated, carries a spur-wheel 14, while the latter carries a pinion 15, meshing with said spur-wheel. The operating-shaft is extended above the handle, as shown, and is provided with an operating-crank 16, whereby it may be rapidly rotated. The shaft 13, which carries the pinion 14, also has a sprocket-wheel 17, which is connected, by means of a chain 18, with a sprocket-wheel 19 upon the disk-carrying shaft 4.

20 designates one of my circular disk files, which consists of a circular plate of file-steel, both sides of which are provided with file-dressings 21, which may be of different degrees of fineness on opposite sides of the disk. In connection with each apparatus it is also my intention to furnish a set of several file-disks having dressings of different degrees of fineness, from the coarsest to the finest, that will usually be required in practice. These file-disks are provided near their peripheral edges with equidistantly-disposed perforations 22, both ends of which are countersunk, so that said disks may be reversed and presented either side outermost when secured to the file-carrying disk 5, which is revolubly mounted, as hereinbefore set forth. The perforations in the file-disks being countersunk at opposite ends will enable this to be accomplished quite easily by means of headed screws, which leave a smooth level surface and which may be readily removed whenever it shall be desired to reverse or to exchange a file-disk.

Suitably secured to the head 2 of the handle is a segmental guard-plate 23, the edge of which extends beyond the face of the file and which is provided, in alinement with the handle-bar 1, with a notch 24, so that said flange may engage on opposite sides of the teeth of the animal, and thus not interfere with the operation of the device. This flange or flanges, which may be said to be formed by the notch 24, will permit the instrument to be used positively without danger to the mouth of the animal, the cheeks and tongue being thereby prevented at all times from coming into contact with the file when the latter is in operation.

A casing 25, which is practically U-shaped in cross-section, is secured to the handle-bar 1, thus forming a housing for the chain by means of which motion is transmitted from the drive-wheel to the file.

Between the file-disk 20 and the carrying-plate 5 I interpose a cushioning-disk 26 of rubber or other suitable material which will serve not only to protect the teeth of the file, which are temporarily not in use, but which will also permit the file-disk to yield slightly while in operation, thereby preventing any harsh pressure upon the teeth of the animal which are being operated upon, thus rendering the operation far less irritating than would otherwise be the case.

The operation of this device will be readily understood from the foregoing description, taken in connection with the drawings hereto annexed. The file-carrying end of the device is inserted into the mouth of the animal and placed in engagement with the tooth that is to be operated upon, and the crank 16 is then operated so as to rotate the disk rapidly. It will be observed that the distribution of pressure will be absolutely even, also that when teeth in the lower jaw are being operated upon the weight of the instrument will assist in furnishing the requisite pressure, while under all circumstances the long arm or handle of the device enables the operator to press the file or grinding element squarely against the teeth to be operated upon.

A very important feature of my invention is the moderate thickness of the entire device, which renders it quite unnecessary to force open the mouth of the horse to any great extent, which would inconvenience the animal and make it restless. The casing or housing 25 may, as shown in dotted lines, be extended entirely over the operating end of the device, thereby protecting the teeth opposite those which are being operated upon. The teeth will usually be operated upon first by a coarse file which will serve to reduce their length and afterward by one or more other files of increasing fineness, thus leaving the teeth with their surface in a perfectly level and polished state.

I would have it distinctly understood that other means than those herein shown may be employed for transmitting power to the rotary file-carrying disk; also, that it is not essential that hand-power should be resorted to, inasmuch as any well-known source of power may be employed. In Fig. 5 of the drawings I have shown a belt 27 and pulley 28 substituted for the chain 18 and sprocket-wheel 19, this being but one form of the modifications which may be resorted to within the scope of my invention.

My improved instrument is simple in construction, efficacious in use, and it may be produced at a moderate expense.

Having thus described my invention, I claim—

1. In a dental veterinary instrument, an abrading-disk having a flat unobstructed abrading-surface, a member axial to said disk whereby the latter is mounted for rotation, and an elongated handle having a bearing transversely to the length thereof for the axial member and constituting a lever whereby pressure may be caused to bear upon the abrading-disk.

2. In a dental veterinary instrument, a flat abrading-disk having an unobstructed abrading-surface, a lever-handle supporting said disk for rotation, and guards supported adjacent to opposite sides of the disk and extending beyond the plane of the abrading-face of said disk.

3. In a dental veterinary instrument, an abrading-disk having a flat unobstructed working face mounted for rotation and supported bodily upon the side of a handle-bar which constitutes a lever.

4. In a veterinary dental instrument, a handle member presenting a flat surface on one side thereof, an abrading-disk mounted for rotation in bodily contact with the flat surface of said handle-bar, means for imparting to said abrading-disk a rotary motion, and curved guard-flanges secured to opposite sides of the handle member, adjacent to opposite sides of the disk and spaced apart from each other, said guard-plates being projected beyond the plane of the working face of the disk.

5. In a veterinary dental instrument, an elongated handle-bar, a driven shaft journaled in said handle-bar, driving mechanism within the handle-bar, a spacing-disk upon the driven shaft, and a flat, circular abrading member upon said spacing-disk and thereby disposed at a distance from the plane of the handle-bar.

6. In a veterinary dental instrument, an elongated handle-bar, a driven shaft mounted near one end of said handle-bar, means within the latter for driving said shaft, a spacing member upon the latter, a flat abrading-disk supported upon said spacing member and having an abrasive face, bounded by its perimeter and spaced from the handle-bar, and oppositely-disposed flanges connected with the sides of the handle-bar adjacent to the diametrically opposite edges of the abrading-disk.

7. In a veterinary dental instrument, an elongated handle-bar forming a lever, a driven shaft supported at one end of said handle-bar, an abrading-disk connected axially with said shaft and spaced from the side of the handle-bar, the entire flat face of said disk being exposed for operative contact with the tooth to be operated upon, and guards adjacent to the edges of said disk for the protection of the cheek and tongue.

8. In a veterinary dental instrument, a handle-bar, a driven shaft, a supporting and spacing member upon the one end of said shaft, a flat abrading-disk connected with said supporting member, and an intermediately-disposed flexible cushion.

9. A handle-bar having a head, flanges attached to said head, a supporting-disk connected revolubly with said head between said flanges, and a flat circular file-disk mounted upon said supporting-disk and having its entire flat grinding-face exposed.

10. A handle-bar having a head, a supporting-disk connected revolubly with said head, a file-disk mounted reversibly upon said supporting-disk, and an interposed flexible cushion.

11. A handle-bar having a head, a supporting-disk revolubly connected therewith, a flat-faced tooth-engaging file having file-dressings on opposite sides thereof, means for connecting said file with the supporting-disk, and an interposed flexible cushion.

In testimony that I claim the foregoing as my own I have hereto affixed my signature in the presence of two witnesses.

CHALKLEY JUSTICE KILLE.

Witnesses:
J. H. JOCHUM, Jr.,
J. ROSS COLHOUN.